J. C. COLE.
RIM CONSTRUCTION FOR DUAL TIRES.
APPLICATION FILED MAR. 25, 1912.

1,151,086.

Patented Aug. 24, 1915.
2 SHEETS—SHEET 1.

WITNESSES:
H. L. Sprague
R. M. Mowry

INVENTOR,
John C. Cole,
BY
Chapin & Co
ATTORNEYS

J. C. COLE.
RIM CONSTRUCTION FOR DUAL TIRES.
APPLICATION FILED MAR. 25, 1912.
1,151,086.
Patented Aug. 24, 1915.
2 SHEETS—SHEET 2.
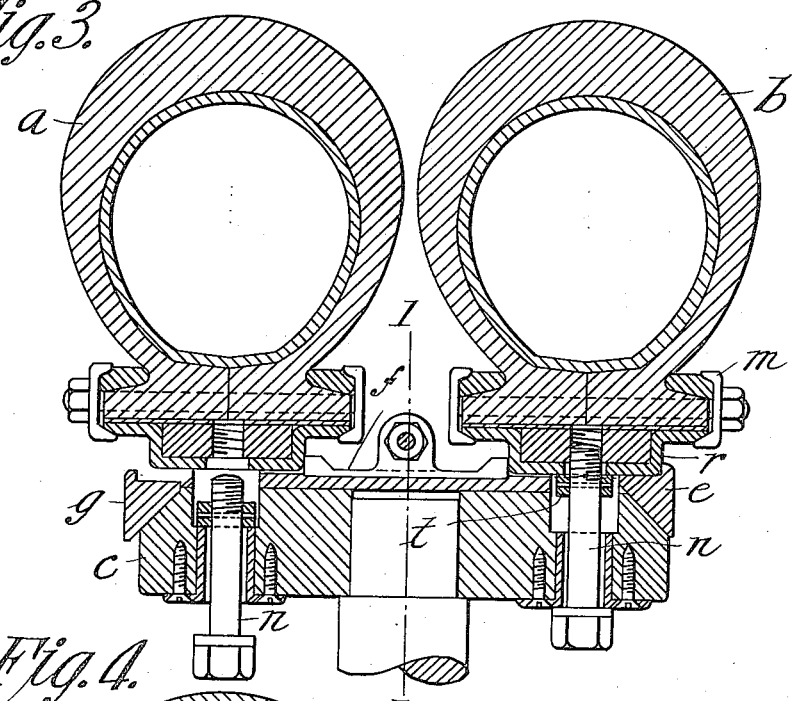
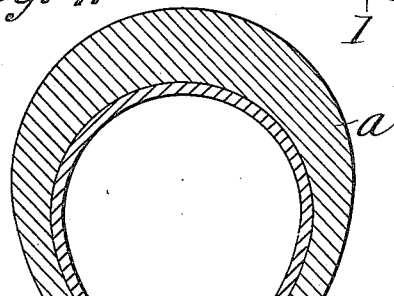
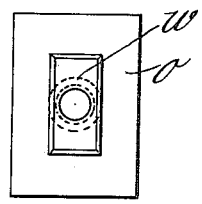
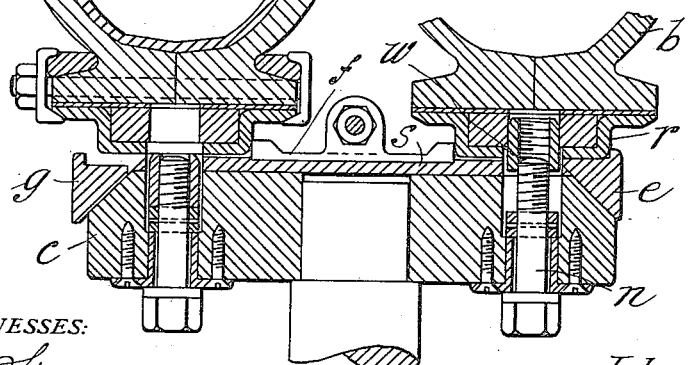
WITNESSES:
INVENTOR,
John C. Cole,
BY
Chapin & Co
ATTORNEYS

UNITED STATES PATENT OFFICE.

JOHN CLARENCE COLE, OF CHICOPEE FALLS, MASSACHUSETTS, ASSIGNOR TO FISK RUBBER COMPANY, OF CHICOPEE FALLS, MASSACHUSETTS, A CORPORATION OF DELAWARE.

RIM CONSTRUCTION FOR DUAL TIRES.

1,151,086. Specification of Letters Patent. Patented Aug. 24, 1915.

Application filed March 25, 1912. Serial No. 686,003.

*To all whom it may concern:*

Be it known that I, JOHN CLARENCE COLE, a citizen of the United States of America, residing at Chicopee Falls, in the county of Hampden and State of Massachusetts, have invented new and useful Improvements in Rim Construction for Dual Tires, of which the following is a specification.

This invention relates to apparatus for handling dual tires that is, a pair of tires fastened to the same felly. Dual tires are usually used on trucks.

The invention specifically relates to a removable and fixed rim construction coöperating with the felly to form a convenient and quick means for removing the tires from the wheel.

The object of the invention is to provide apparatus of the class referred to in which both tires may be removed from the same side of the wheel quickly and with little trouble.

Other objects will appear in the following detailed description and annexed claims.

Figure 1:
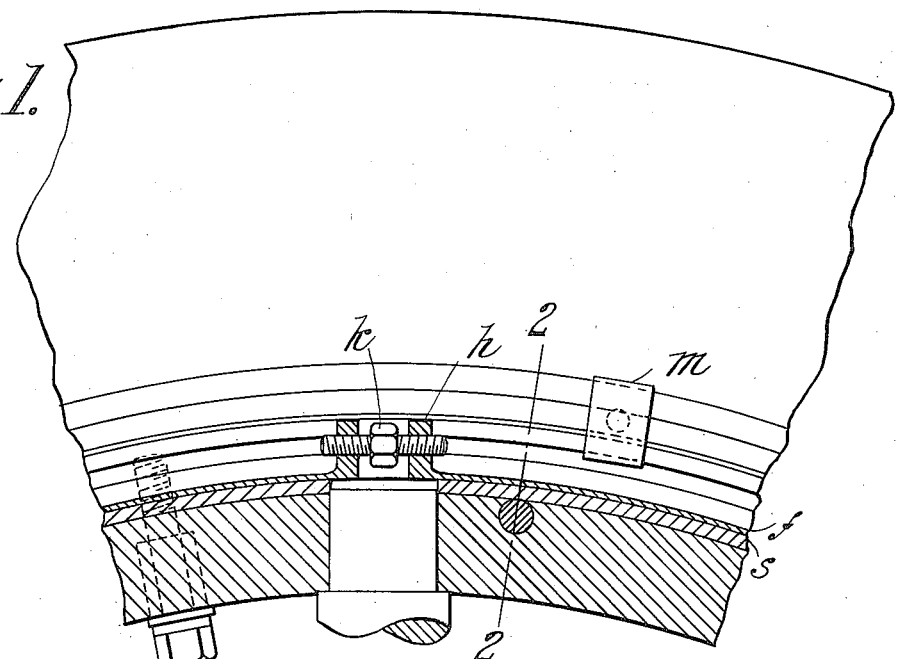
Figure 2:
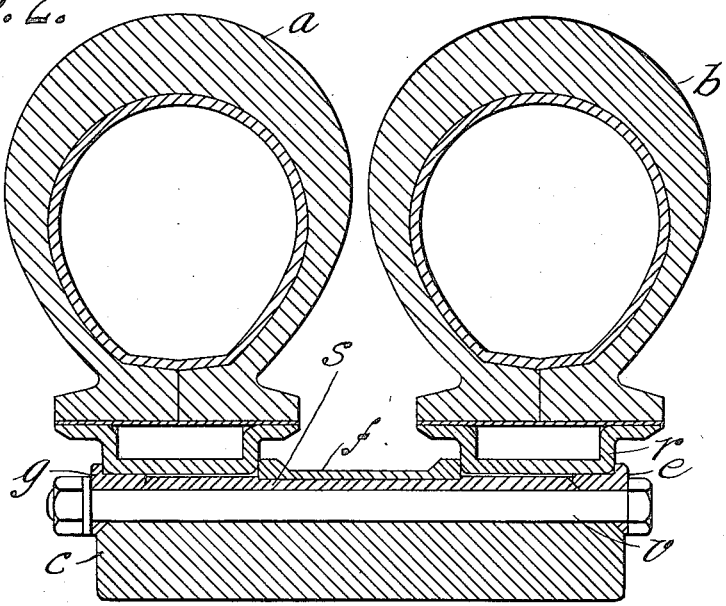

In the drawings forming part of this application,—Figure 1 is a sectional view taken on the line 1—1 of Fig. 3. Fig. 2 is a sectional view taken on the line 2—2 of Fig. 1. Figs. 3 and 4 are cross sectional views showing two methods to prevent the creeping of the removable rim in an apparatus embodying the invention. Fig. 5 is a plan detail view.

Referring to Fig. 2 of the drawings, $c$ is the felly on which the fixed rim $s$ is fastened permanently by any suitable method. The two removable rims $r$ are adapted to fit on the fixed rim each one carrying a tire, as $a$ and $b$, bolted, or otherwise fastened, to the removable rims by fastening devices $m$ (see Figs. 1 and 3). In Fig. 2, if the tire $b$ be considered as the one next the body of the vehicle, then its removable rim $r$ is placed on the fixed rim first. The flange on the expanding ring $e$ will hold the inside rim $r$ from axial movement in one direction. In order to hold the rim $r$ from axial movement in the other direction, a split ring $f$ (provided with lugs $h$, engaged by a right and left-handed take-up screw device $k$,) is put on the fixed rim, as indicated. A flange on the split ring bears against the removable rim. The split ring is preferably let down in a slight depression of the fixed rim and firmly fastened therein by the take-up screw $k$. The outside movable rim is now put on until it lies against an adjacent flange on the split ring $f$. The expanding ring $g$ holds the other side of this removable rim. A bolt $v$ passing clear through the felly has its head bearing against the expanding ring $e$, while its nut bears against the expanding ring $g$. By turning the nuts to simultaneously take up these expanding rings which have beveled faces coöperating with like faces on the felly, as in the usual construction, the removable rims are held firmly in place.

Whenever it is desired to remove one or both of the tires $a$ and $b$ from the wheel, they may be removed from the same side as follows: The nuts on the bolts $v$ are loosened to allow expanding ring $g$ to go into inoperative position. The tire $a$ with its rim is then removed and the split ring $f$ taken off the fixed rim in the same manner as the tire $a$, after which the tire $b$, with its rim, is removed from the same side as the tire $a$ was. It is seen from the description that both tires are removed from the one felly with the operator working on one side only of the wheel in a simple and convenient manner.

In Figs. 3, 4, and 5 of the drawings, two means for preventing any creeping of movement of the removable rim relative to the fixed rim are shown. In Fig. 3, a bolt $n$ passes radially through the felly and fixed rim and engages a thread in the block $o$ of the removable rim. A recess in the felly and fixed rim, through which the bolt $n$ passes, provides room for a pin and collar $t$ fixed to the bolt to move therewith. This feature is for preventing the loss of the bolt. The bolt will always be ready for use, as indicated at the left hand side of Fig. 3. When it is screwed in place, as shown in the right of Fig. 3, said bolt prevents any creeping. Any number of these anti-creeping devices as desired are used around the felly.

In Fig. 4, a second form of anti-creeping device is shown. A rectangular block $w$ fitting the recess in the felly has a thread therein engaged by the bolt $n$. When the latter is turned, the block $w$ is forced up into the block $o$ while the bolt $n$ is always in place to turn.

While applicant has described his invention as specifically applied to the structure shown, it can be applied to other structures than that specifically shown and described.

What I claim is:—

1. In a structure of the class described, two removable rims, a felly, a fixed rim thereon adapted to support the two removable rims, fastening and positioning means for the removable rims on the fixed rim comprising a split self-expanding ring having a seat on the fixed rim in which it may be contracted and positioned against axial movement, and shoulders on the ring against each of which a removable rim is adapted to bear, means for seating the split ring, and devices for forcing and holding the removable rims against the shoulders of the split ring.

2. The combination of a felly, a flat, fixed rim secured thereto, two removable rims each adapted to fit over the fixed rim, holding devices having beveled bearing faces and flanges movable into position to prevent the removable rims from leaving the fixed rim, a spacing means to keep the two removable rims in proper spaced relation on the fixed rim, and means to position and seat the spacing means on the fixed rim independently of the removable rims, all for the purpose described.

3. A wheel construction adapted for use with dual tires comprising a felly, two expanding rings each having an outer holding flange, one ring on each side of said felly, bolts passing therethrough to operate both expanding rings into operative and inoperative position, two removable rims one adapted to enter on and over said felly after the other from the same side thereof, a spacing ring adapted to also enter on and over said felly from the same side as the rims and between said rims, and keep them in proper spaced relation on the felly, the edge of said spacing ring coöperating with the expanding rings to give an effective holding means for said rims and means independent of the removable rims to bind the spacing ring in position on the felly to coöperate with the expanding rings.

4. The combination of a felly having a fixed rim provided with a plurality of radially arranged openings, a removable rim provided with a plurality of correspondingly arranged openings and adapted to fit over the fixed rim, and means to prevent creeping of the removable rim comprising permanently mounted radially arranged bolts in the openings of the felly and members threaded on the several bolts arranged to engage the walls of the said openings and be moved, as the bolts are turned, radially into and out of the openings of the removable rim to engage the walls thereof, other means to hold the removable rim from axial movement, said creep-preventing means and rim-holding means being functionally independent.

JOHN CLARENCE COLE.

Witnesses:
 FRANKLIN G. NEAL,
 HARRY W. BOWEN.